United States Patent
Dellow

(10) Patent No.: US 7,987,351 B2
(45) Date of Patent: Jul. 26, 2011

(54) METHOD AND SYSTEM FOR ENHANCED BOOT PROTECTION

(75) Inventor: Andrew Dellow, Minchinhampton (GB)

(73) Assignee: Broadcom Corporation, Irvine, CA (US)

( * ) Notice: Subject to any disclaimer, the term of this patent is extended or adjusted under 35 U.S.C. 154(b) by 1111 days.

(21) Appl. No.: 11/746,764

(22) Filed: May 10, 2007

(65) Prior Publication Data

US 2008/0086629 A1 Apr. 10, 2008

Related U.S. Application Data

(60) Provisional application No. 60/828,567, filed on Oct. 6, 2006.

(51) Int. Cl.
*G06F 15/177* (2006.01)
*G06F 12/14* (2006.01)
*H04L 9/32* (2006.01)

(52) U.S. Cl. ............... 713/2; 713/1; 713/164; 713/176; 713/193

(58) Field of Classification Search .................. 713/1, 2, 713/164, 176, 193
See application file for complete search history.

(56) References Cited

U.S. PATENT DOCUMENTS

| | | | |
|---|---|---|---|
| 2003/0233562 A1* | 12/2003 | Chheda et al. | 713/193 |
| 2005/0076226 A1* | 4/2005 | Boivie et al. | 713/187 |
| 2005/0114687 A1* | 5/2005 | Zimmer et al. | 713/193 |
| 2006/0080522 A1* | 4/2006 | Button et al. | 713/2 |
| 2006/0155988 A1* | 7/2006 | Hunter et al. | 713/164 |
| 2006/0294513 A1* | 12/2006 | Bar-El et al. | 717/168 |
| 2007/0074048 A1* | 3/2007 | Rudelic et al. | 713/193 |
| 2007/0180269 A1* | 8/2007 | Irish et al. | 713/193 |
| 2007/0192610 A1* | 8/2007 | Chun et al. | 713/176 |
| 2007/0220276 A1* | 9/2007 | Croxford et al. | 713/193 |
| 2008/0200206 A1* | 8/2008 | Mansson et al. | 455/556.1 |

* cited by examiner

*Primary Examiner* — Vincent T Tran
(74) *Attorney, Agent, or Firm* — McAndrews, Held & Malloy, Ltd.

(57) ABSTRACT

A secondary boot code may be copied to memory during execution of a primary boot code, and executing the copied secondary boot code after completion of execution of said primary boot code. Access to the primary and said secondary boot code may be restricted during execution of the primary boot code and the copied secondary boot code. The copied secondary boot code may be verified after the secondary boot code is copied to the memory. Access to the primary boot code may be blocked or barred during execution of the copied secondary boot code. Access to the secondary boot code may also be blocked or barred after completion of execution of the copied secondary boot code. The memory may comprise double-data-rate synchronous dynamic random access memory (DDR). The primary and/or the secondary boot code may reside or be stored in FLASH memory.

27 Claims, 10 Drawing Sheets

METHOD AND SYSTEM FOR ENHANCED BOOT PROTECTION

CROSS-REFERENCE TO RELATED APPLICATIONS/INCORPORATION BY REFERENCE

This patent application makes reference to, claims priority to and claims benefit from U.S. Provisional Patent Application Ser. No. 60/828,567 filed on Oct. 6, 2006.

The above stated application is hereby incorporated herein by reference in its entirety.

FIELD OF THE INVENTION

Certain embodiments of the invention relate to system boot security. More specifically, certain embodiments of the invention relate to a method and system for enhanced boot protection.

BACKGROUND OF THE INVENTION

Many deployed systems run various different software applications. At times, some of those applications require, for example, software modifications, upgrades, updates and/or security patches downloads. When such software modifications, upgrades, updates and/or security patch downloads are made, the system may need to be rebooted in order to effectuate the changes in the applications. For example, in cable or satellite systems, a system operator at a head-end may be required to remotely modify code that may reside on set-top boxes which may be located in, for example, subscribers' homes. These types of software modifications, upgrades, updates and/or security patch downloads should be done in a secure manner, since it may be important to ensure that there is no compromise in system integrity. Hence, for example, hackers should not be able to take control of a set-top box or other devices when software modifications, upgrades, updates and/or security patch downloads are being made.

For security purposes, such applications would typically require a boot loader code or boot code, which would relate specifically to the application and would be used to help facilitate any such changes and/or modifications. To meet the requirement for 'divorce,' that is, changes in the applications in deployed systems, the application-specific boot code cannot be the primary boot loader. This is because the primary boot loader code must be able to load independently in order to be able to download a new application boot code. Furthermore, the primary boot code is owned by the deployed system owner rather than the application. For these reasons, a dual boot architecture is required, where the system primary boot code would run, and then it can select and load a security specific boot code, a secondary boot code, which would in turn load and run the application code related to the secondary boot code.

To protect against the potential security threats during boot situations, the standard method for boot protection is to use a boot memory, typically a ROM, which causes a signature check of the boot code each reset cycle. However, this boot ROM today would only cause a check of the primary boot loader. Extending security protection to subsequent phases in system boot, for example, when the secondary boot code and application are loaded and run, is clearly desirable. This is currently achieved using a software chain of trust from the 'ROM checked' primary boot code. This primary boot loader software signature checks a secondary boot loader and then jumps to it. This secondary boot loader signature checks the main application and jumps to it.

One problem associated with such a process is that the only hardware-based check takes place during the primary boot code verification. In the subsequent phases of system boot, the system becomes vulnerable to possible security breaches, especially when the execution is from flash memory, a relatively simple, slow and therefore vulnerable bus. Enhancing protection during boot operations would improve the system protection against potential security breaches.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for enhanced boot protection, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for enhanced boot protection. Exemplary aspects of the invention may comprise copying a secondary boot code to memory during execution of a primary boot code, and executing the copied secondary boot code after completion of execution of said primary boot code. The copied secondary boot code may be verified after the secondary boot code is copied to the memory. Access to the primary and said secondary boot code may be restricted during execution of the primary boot code and the copied secondary boot code. Access to the primary boot code may be blocked or barred during execution of the copied secondary boot code. Access to the secondary boot code may also be blocked or barred after completion of execution of the copied secondary boot code. The memory may comprise double-data-rate synchronous dynamic random access memory (DDR). The primary boot code and/or the secondary boot code may reside or be stored in FLASH memory. Application code related to the secondary boot code may be copied to the memory. The copied application code may be executed after completion of execution of the copied secondary boot code.

Figure 1A:
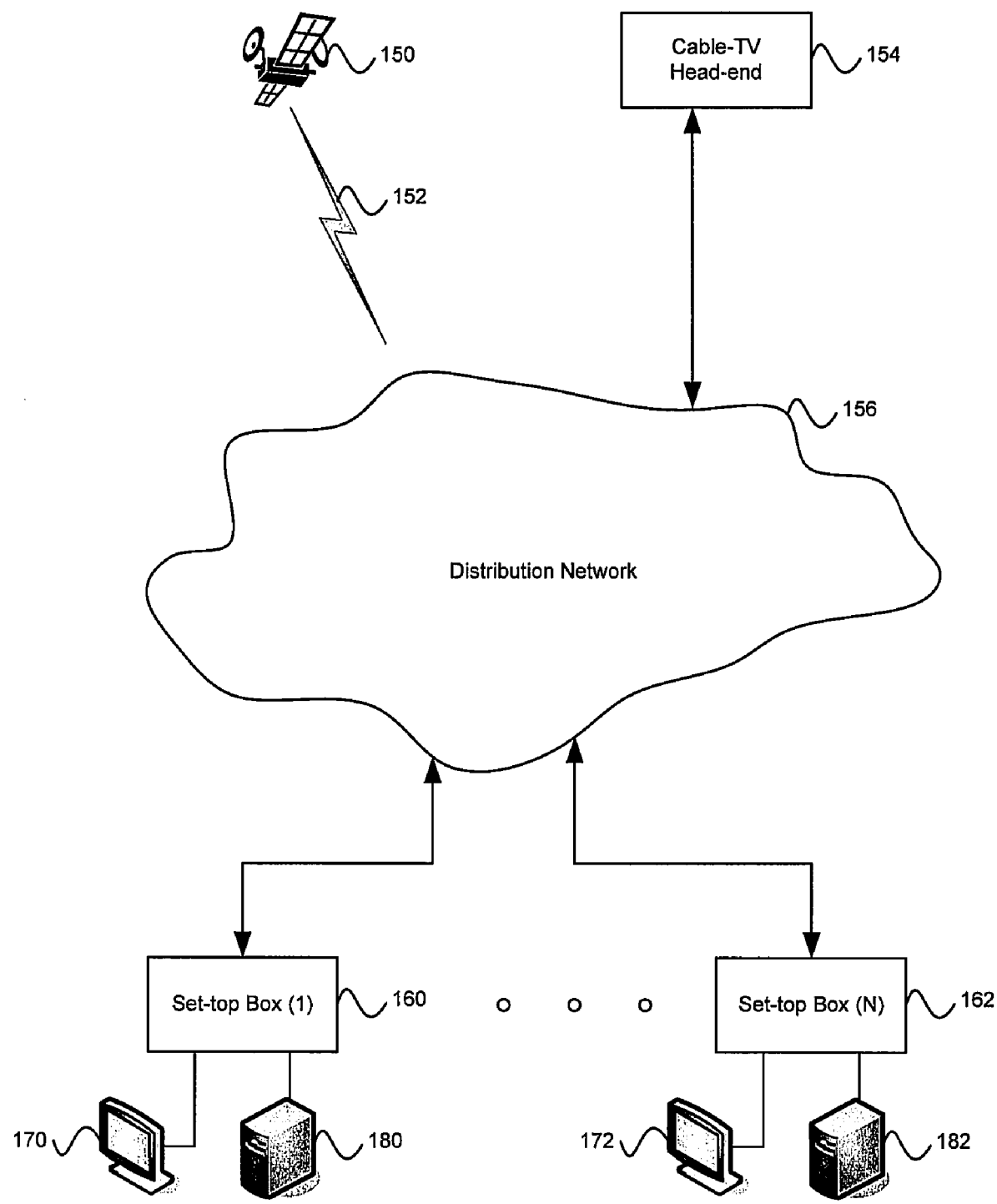
FIG. 1A is a block diagram illustrating an exemplary high-level system, which may be utilized in accordance with an embodiment of the invention.

FIG. 1A is a block diagram illustrating an exemplary high-level system, which may be utilized in accordance with an embodiment of the invention. Referring to FIG. 1A, there is shown a Satellite head-end 150, a satellite link 152, a Cable-TV head-end 154, distribution Network 156, a Set-top Box 160 through a Set-top Box 162, a display terminal 170 through a display terminal 172, and a PC 180 through a PC 182.

The Cable-TV head-end 154 may comprise suitable hardware and/or software that may enable communication with set-top boxes 160, . . . , 162, via one or more distribution networks such as the distribution network 156. The satellite head-end 150 may comprise suitable hardware and/or software that may enable communication with set-top boxes via distribution networks. The satellite link 152 may comprise suitable communication link that may enable communication between the satellite head-end 150 and a distribution network 156. The distribution Network 156 may comprise suitable distribution system that may enable communication between the head-ends 150 and 154, and the set-top boxes 160, . . . , 162. The Set-top Boxes 160, . . . , 162 may comprise suitable hardware and/or software that may enable processing and boot operations. The display terminal 170, . . . , 172 may comprise suitable hardware and/or software, which may enable displaying information visually. The display terminal 170 may comprise, for example, a monitor or a TV set. The PC 180, . . . , 182 may comprise suitable computer systems.

In operation, the Cable-TV head-end 154 may communicate with the Distribution Network 156 to transmit software modifications, upgrades, updates and/or security patch downloads to the distribution Network 156. The Satellite head-end 150 may communicate with the distribution Network 156, via the satellite link 152, to transmit software modifications, upgrades, updates and/or security patch downloads to the Distribution Network 156. The distribution Network 156 may transmit the received software modifications, upgrades, updates and/or security patch downloads to the Set-top Boxes 160, . . . , 162. The Set-top Boxes 160, . . . , 162 may perform system boot to effectuate received software modifications, upgrades, updates and/or security patch downloads, in accordance with various embodiments of the invention.

Figure 1B:
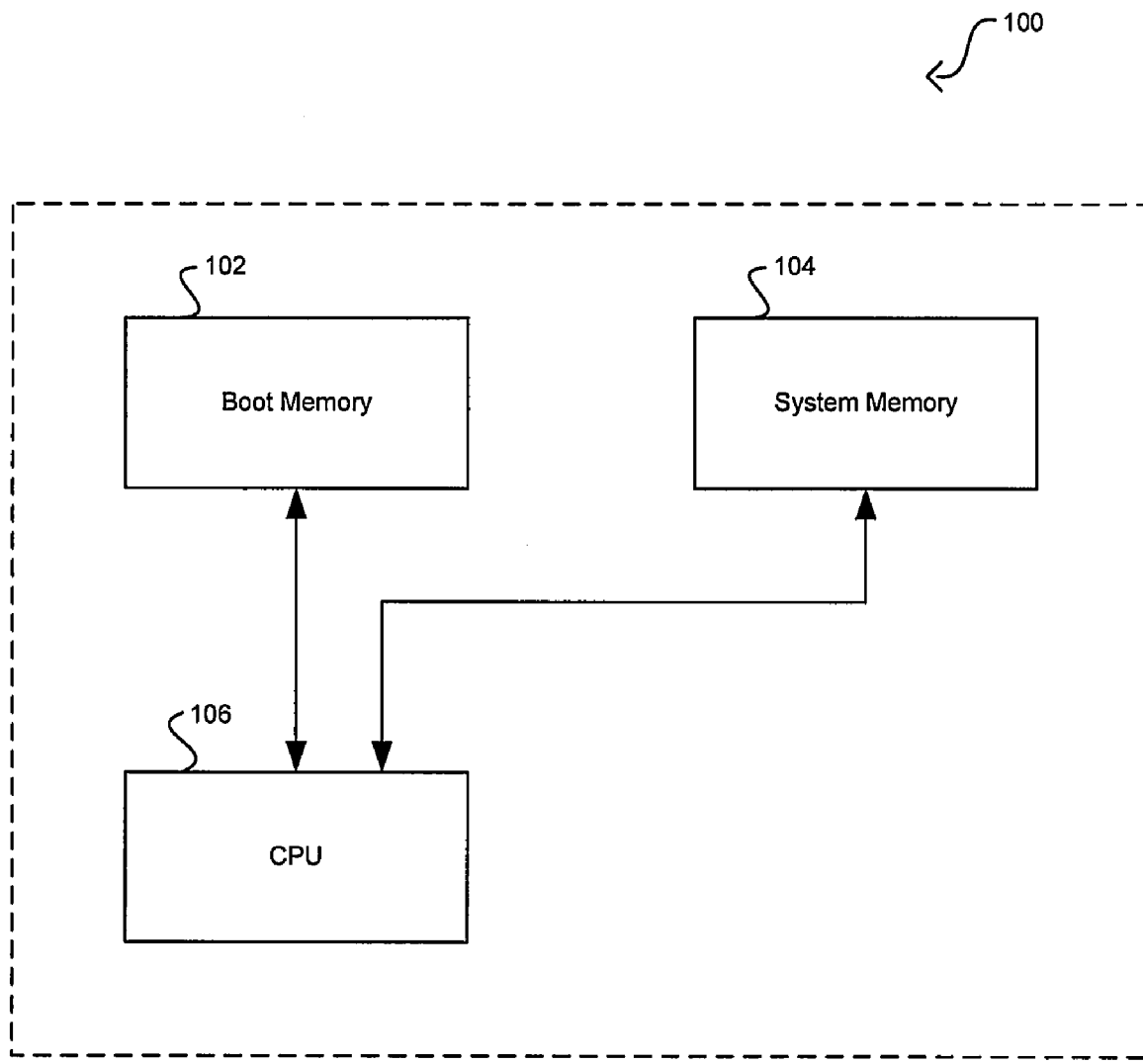
FIG. 1B is a block diagram illustrating an exemplary system, which may be utilized in accordance with an embodiment of the invention.

FIG. 1B is a block diagram illustrating an exemplary system, which may be utilized in accordance with an embodiment of the invention. Referring to FIG. 1B, there is shown a system 100 that may comprise a central processing unit (CPU) 106, a boot memory 102, and a system memory 104.

The boot memory 102 may comprise suitable logic, circuitry and/or code that may enable storage of code used in system boot. The system memory 104 may comprise suitable logic, circuitry and/or code that may enable storage of code and data used in system memory operations. The CPU 106 may comprise suitable logic, circuitry and/or code that may enable processing operations. The invention may not be limited to a CPU, but may comprise for example, a general purpose processor, a specialized processor or any combination of suitable hardware, firmware, software and/or code, which may be enabled to provide enhanced boot protection in accordance with the various embodiments of the invention. In this regard, the system memory 102 may comprise different memory technologies, for example, random access memory (RAM). The boot memory may also comprise different memory technologies, for example, read only memory (ROM).

In operation, the CPU 106 may perform various processing operations including, but not limited to, processing data and performing code instructions. The CPU 106 may enable copying of a secondary boot code to memory during execution of a primary boot code, and executing the copied secondary boot code after completion of execution of the primary boot code. The primary boot code and the secondary boot code may reside in the boot memory 102. The copied secondary boot code may be verified by the CPU 106 after the secondary boot code is copied to the memory. The CPU 106 may be enabled to block or bar access to the primary boot code during execution of the copied secondary boot code, and also block or bar access to the secondary boot code after completion of execution of the copied secondary boot code. Application code related to the secondary boot code may be copied by the CPU 106 to the memory. The copied application code may be executed by the CPU 106 after completion of execution of the copied secondary boot code.

The system memory 104 may allow storage of data and code used by the CPU 106, especially when access speed is important. The boot memory 102 may allow storage of code that is used in certain operations such as system boot operations. During system boot by the CPU 106, code necessary for the boot operations may reside in the boot memory 102. The CPU 106 may perform the boot operations by accessing the relevant code from the boot memory 102. The CPU 106 may access the system memory 104 during boot operation to store and fetch code and/or data that pertain to the system boot.

Figure 1C:
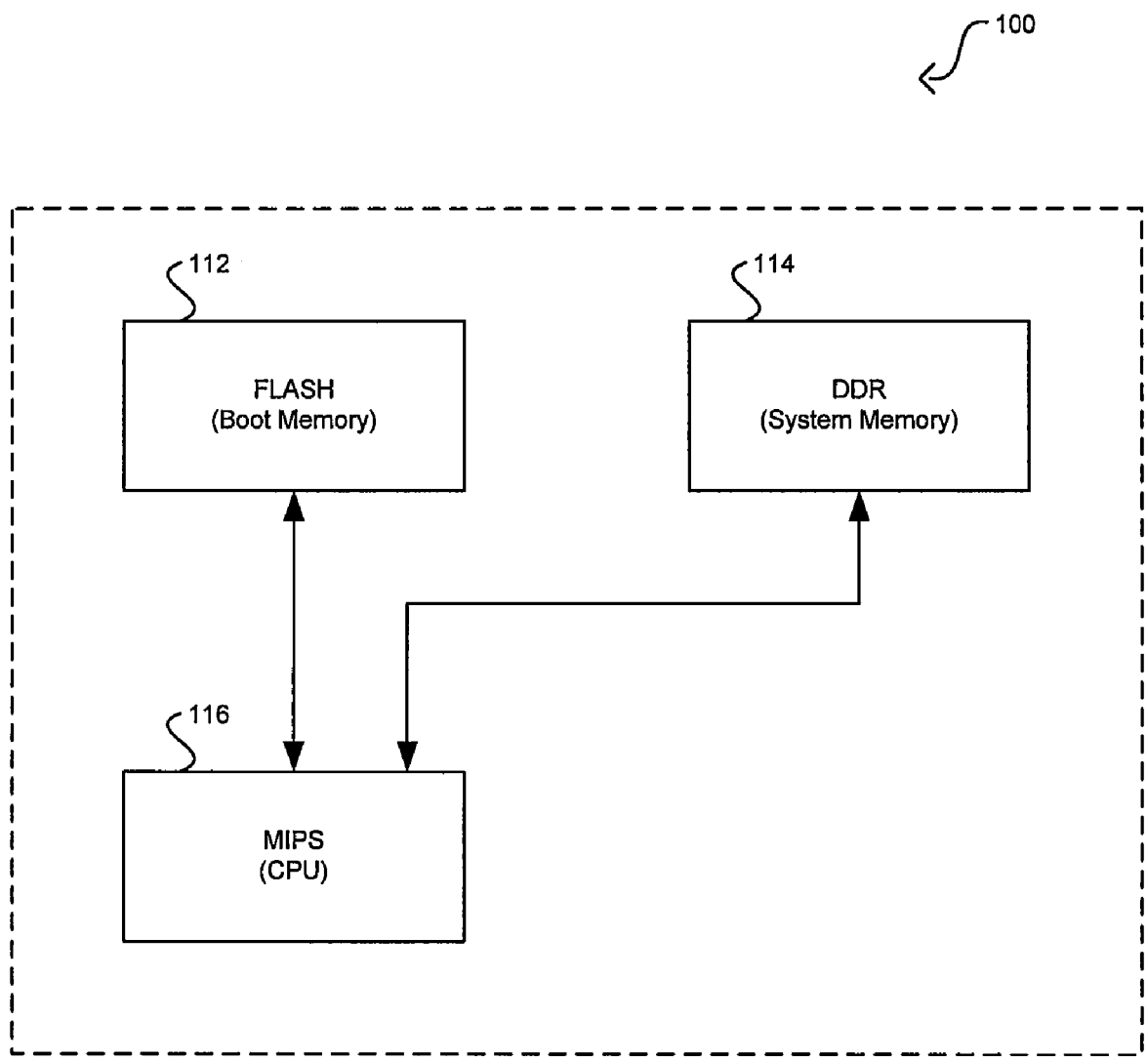
FIG. 1C is a block diagram illustrating an exemplary system that uses a DDR (double-data-rate synchronous dynamic random access memory), a FLASH memory, and a MIPS processor, which may be utilized in accordance with an embodiment of the invention.

FIG. 1C is a block diagram illustrating an exemplary system that uses a DDR (double-data-rate synchronous dynamic random access memory), a FLASH memory, and a processor such as MIPS processor, which may be utilized in accordance with an embodiment of the invention. Referring to FIG. 1C, there is shown the system 100 where a FLASH memory 112, a DDR 114, and a MIPS processor 116 may correspond to the boot memory 102, the system memory 104, and the CPU 106 disclosed in FIG. 1B. In operation, the system 100 may operate in a manner as described with respect to FIG. 1B.

The MIPS processor 116 may enable copying of a secondary boot code to memory during execution of a primary boot code, and executing the copied secondary boot code after completion of execution of the primary boot code. The primary boot code and the secondary boot code may reside in the FLASH memory 112. The MIPS processor 116 may verify the copied secondary boot code after the secondary boot code is copied to the memory. The MIPS processor 106 may be enabled to block or bar access to the primary boot code during execution of the copied secondary boot code, and also block or bar access to the secondary boot code after completion of execution of the copied secondary boot code. The MIPS processor 116 may enable copying of the application code related to the secondary boot code to the memory. The copied application code may be executed by the MIPS processor after completion of execution of the copied secondary boot code.

Figure 2:
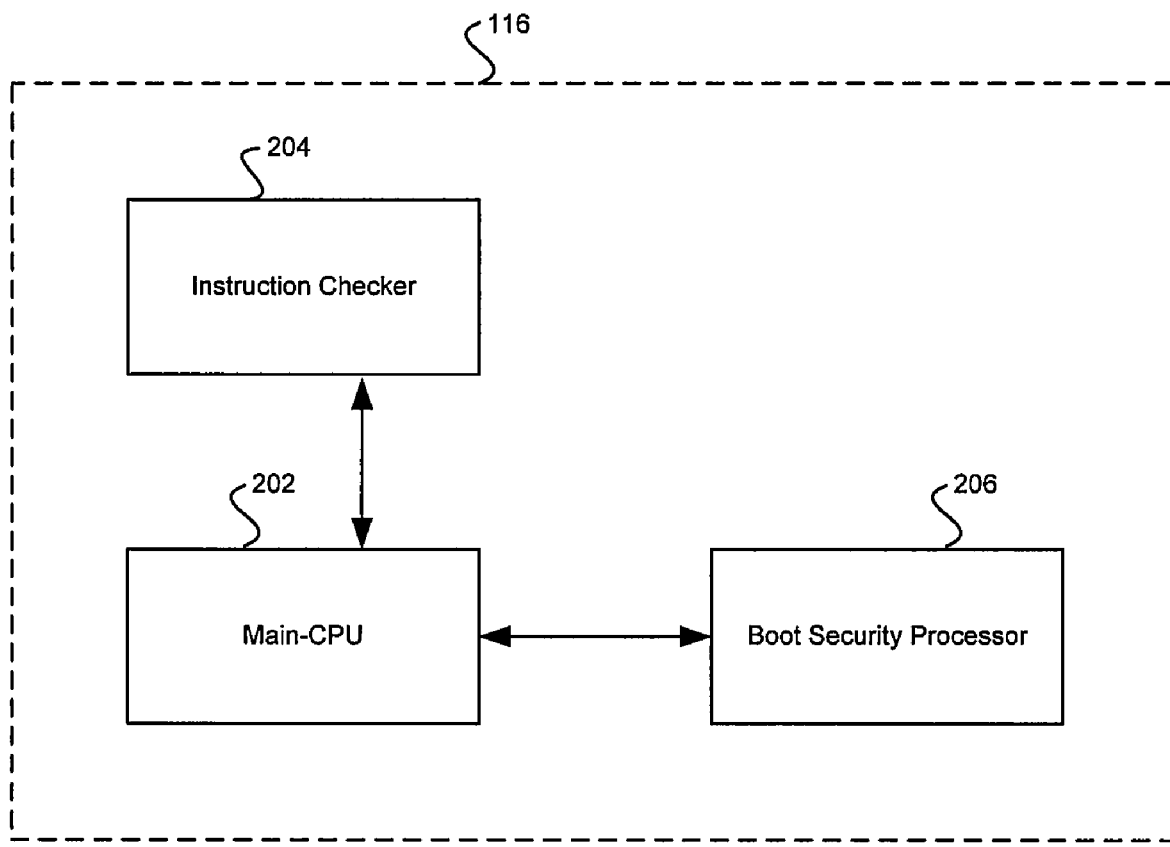
FIG. 2 is a block diagram illustrating an exemplary system that uses a central processing unit with a Boot Security Processor, which may be utilized in accordance with an embodiment of the invention.

FIG. 2 is a block diagram illustrating an exemplary system that uses a central processing unit with a Boot Security Processor, which may be utilized in accordance with an embodiment of the invention. Referring to FIG. 2, there is shown the MIPS processor 116 that may comprise a main processing sub-system (main-CPU) 204, an Instruction Checker (MICH), and a Boot Security Processor (BSP) 206. The main-CPU 202 may comprise suitable logic, circuitry and/or code that may enable performing CPU operations. The Instruction Checker (MICH) 204 may comprise suitable logic, circuitry and/or code that may limit access of CPU during instruction execution to specific code locations. The BSP 206 may comprise suitable logic, circuitry and/or code that may enable performing operations that enhance protection and security during system boots.

In operation, the MIPS processor 116 may perform various processing operations, which may include, but are not limited to, processing data and performing code instructions. The main-CPU 202 may perform such said CPU operations. The Instruction Checker (MICH) 204 may limit the access of main-CPU 202 to specific sets of instructions that have been previously verified and/or fetched from the boot memory 102 and/or the system memory 104 by storing the locations of these code sets and limiting the main-CPU 202 access to these stored locations. The BSP 206 may enhance protection and security during boot operation by monitoring and controlling the operations of the main-CPU 202 and the Instruction Checker (MICH) 204, and by monitoring and controlling access to and function of the boot memory 102 and system memory 104.

Figure 3A:
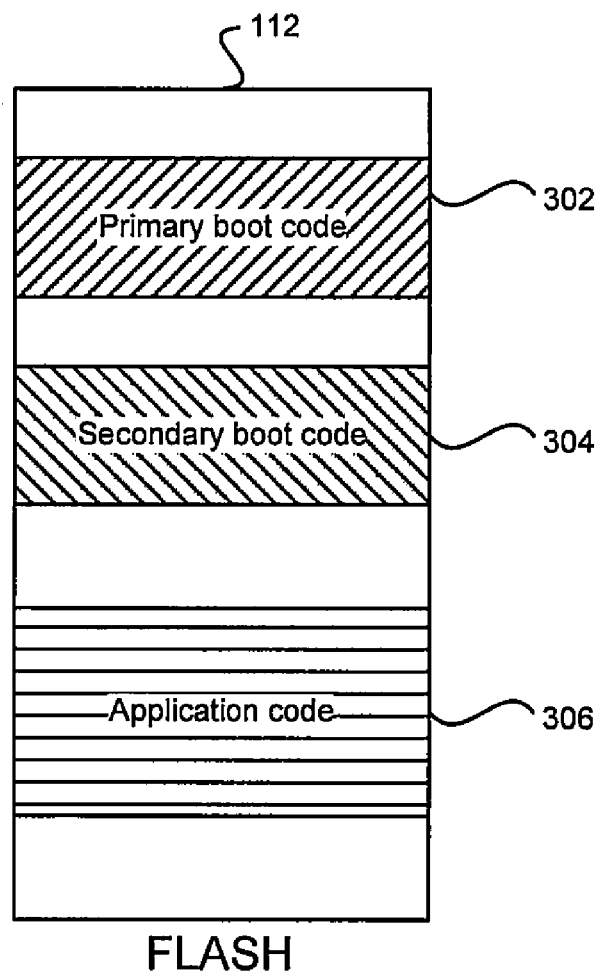
FIG. 3A is a diagram that illustrates exemplary fragmentation of storage of different boot and application codes in the FLASH memory, in connection with an embodiment of the invention.

FIG. 3A is a diagram that illustrates exemplary fragmentation of storage of different boot and application codes in the FLASH memory, in connection with an embodiment of the invention. Referring to FIG. 3A, there is shown an internal memory partition of the FLASH memory 112, illustrating various memory segments that may comprise a primary boot code 302, a secondary boot code 304, and application code 306.

In operation, the primary boot code 302 may perform general configuration operations of the system 100 in system boot. The application code 306 may perform operations pertaining to a specific application running in the system 100 and may also perform modifications, updates and patch downloads for said application. The secondary boot code 304 may perform specific configuration operations in conjunction with application code 306 in system boot.

Figure 3B:
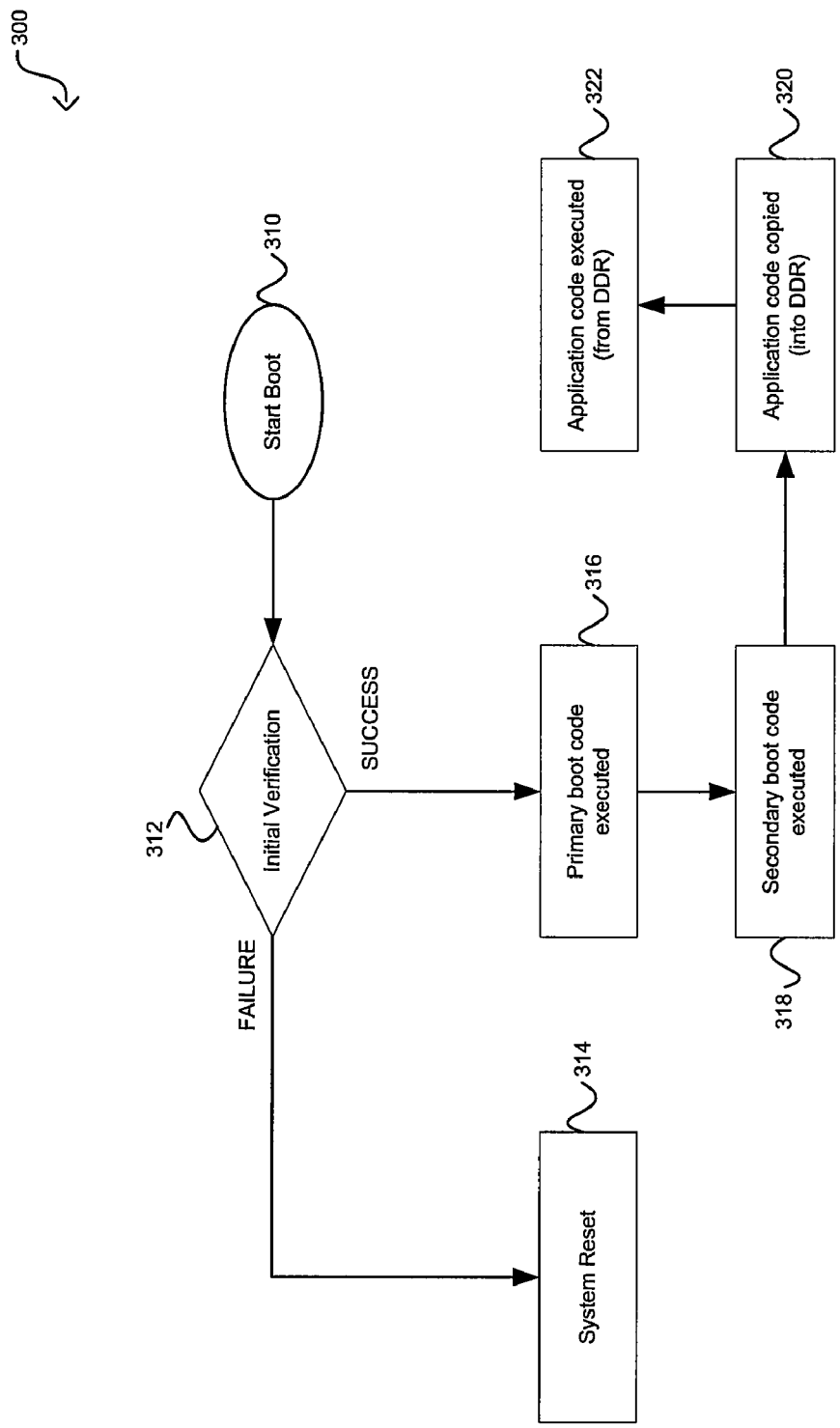
FIG. 3B is a flow diagram that illustrates an exemplary system that may be utilized dual boot architecture, in connection with an embodiment of the invention.

FIG. 3B is a flow diagram that illustrates an exemplary system that may be utilized dual boot architecture, in connection with an embodiment of the invention. Referring to FIG. 3B, there is shown flow chart 300. In step 310, a boot operation may be initiated in the system 100. In step 312, an initial verification may be performed. This initial verification may comprise use of any software signature authentication procedure, but it may also comprise hardware based check. In instances where an outcome of the initial verification may result in a FAILURE, the process may proceed to step 314. In step 314, the system 100 may be reset.

Returning to step 312, in instances when the outcome of the initial verification may be SUCCESS, the process may proceed to step 316. In step 316, the primary boot code 302 may be executed. In step 318, the secondary boot code 304 may be executed. In step 320, the application code 306 may be copied to the DDR 114. In step 322, the MIPS processor 116 may execute the application code 306 from the DDR 114.

Figure 4:
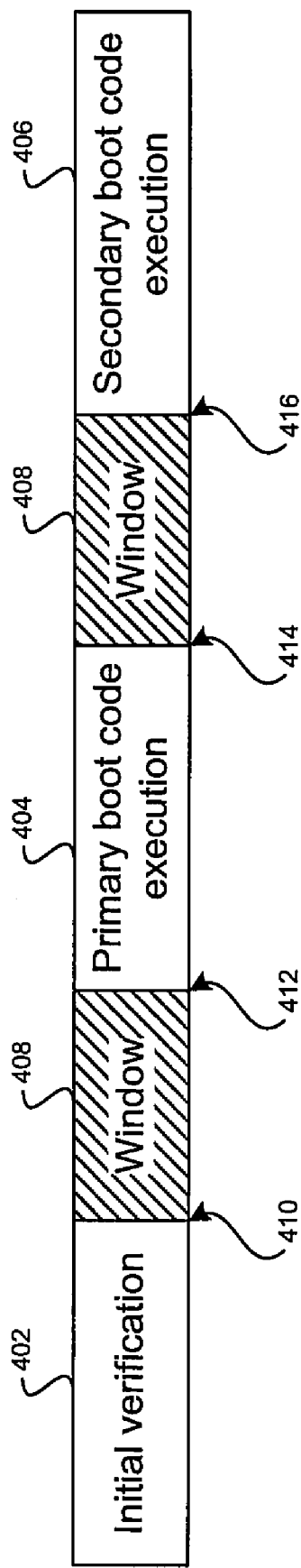
FIG. 4 is a diagram that illustrates an exemplary window of vulnerability during a dual boot operation, in connection with an embodiment of the invention.

FIG. 4 is a diagram that illustrates an exemplary window of vulnerability during a dual boot operation, in connection with an embodiment of the invention. Referring to FIG. 4, there is shown a timing sequence for operations in a dual boot scenario, which illustrates an initial verification phase 402, a primary boot code execution phase 404, a secondary boot code execution phase 406, timing windows 406, an end of initial verification 410, a start of the primary boot code execution at point 412, an end of primary boot code execution at point 414, and a start of the secondary boot code execution at point 416.

In dual boot scenarios that may comprise a primary and a secondary boot code, the MIPS processor 116 may perform initial verification 402 before the primary boot code execution 404. In instances when execution of primary boot code may be completed, the MIPS processor 116 may perform the secondary boot code execution 406. Between the end of the initial verification 410 and the start of the primary code execution at point 412, a window of vulnerability 408 may exist, which may be due to a delay in the FLASH memory access the window of opportunity 408 may also exist between the end of the primary code execution at point 414 and the start of the secondary code execution at point 416. Without further verification, the MIPS processor 116 may jump to improper memory locations within the FLASH after the end of the primary code execution.

In operation, during the initial verification 402, the system may verify, for example, authenticity of the primary boot code 302 that may reside in the FLASH memory 112. This verification may also comprise hardware signature checking. Once the initial verification is completed successfully, the primary boot code 302 may be enabled to initiate the primary boot code execution phase 404. When primary boot code execution phase 404 completes at point 410, the MIPS processor 116 may be enabled to jump before starting to execute the secondary boot code 304, which may reside in a non-contiguous location within the FLASH memory 112. After the end of the initial verification at point 410 and before the start of the primary code execution at point 412, a window of vulnerability 408 may exist, which may be due mainly to delays in the FLASH memory 112 access. The window of opportunity 408 may also exist after the end of the primary code execution at point 414 and before the start of the secondary code execution at point 416. During that window of opportunity 408, the system may be vulnerable to security breaches, which, without further hardware-based verification, may cause the MIPS processor 116 to jump to improper memory locations within the FLASH after the end of the primary code execution 410.

Figure 5:
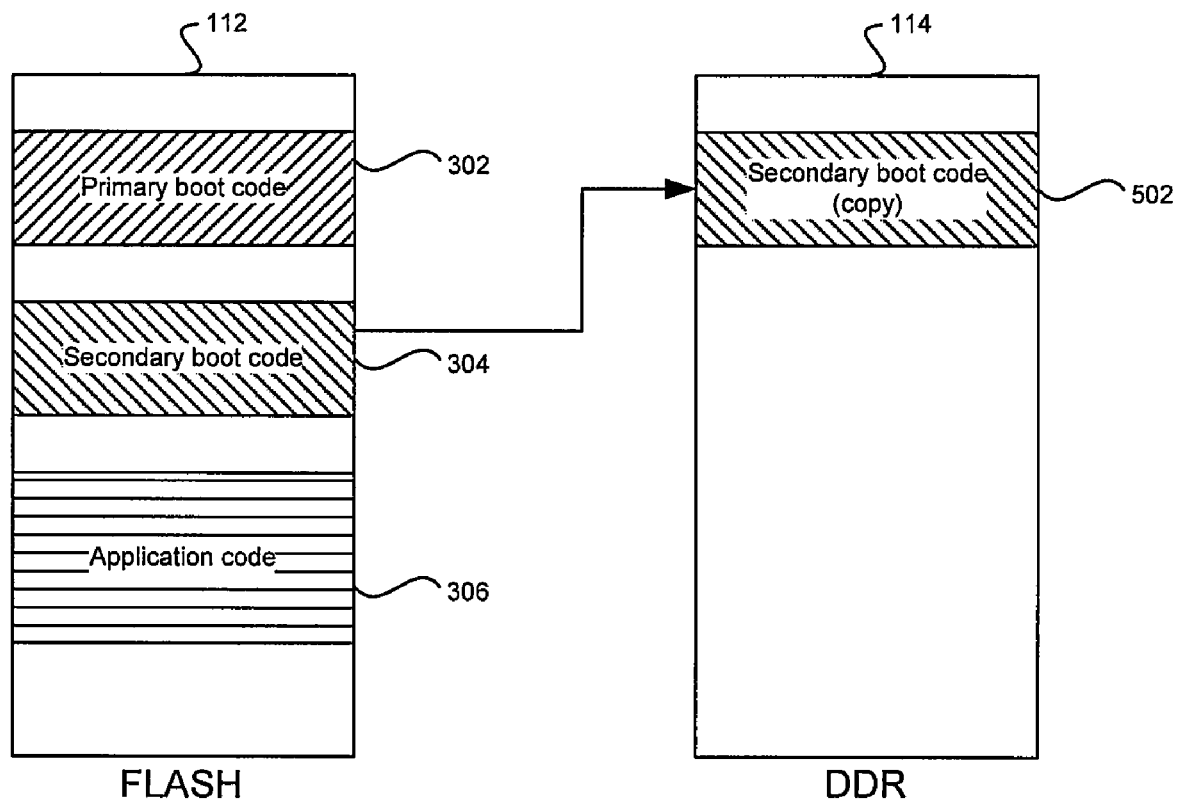
FIG. 5 is a diagram that illustrates copying of secondary boot code to the DDR, which may be utilized in accordance with an embodiment of the invention.

FIG. 5 is a diagram that illustrates copying of secondary boot code to the DDR, which may be utilized in accordance with an embodiment of the invention. Referring to FIG. 5, there is shown the internal memory partition of the FLASH memory 112, illustrating various memory segments that may comprise the primary boot code 302, the secondary boot code 304, and the application code 306. FIG. 5 also shows the internal memory partition of the DDR 114, illustrating various segments that may comprise a secondary boot code copy 502. In operation, the secondary boot code 304 may be copied to the DDR 114 from the FLASH memory 102 as part of the execution sequence of primary boot code 302.

The CPU 106 may enable execution of the primary boot code 302, which may enable copying of a secondary boot code 304 to DDR memory 114. The CPU 106 may enable execution of the copied secondary boot code 502 from the DDR 114 after completion of execution of the primary boot code 302. The primary boot code 302 and the secondary boot code 304 may reside in the boot memory 102. The copied secondary boot code 502 may be verified by the CPU 106 after the secondary boot code 304 is copied to the memory. The CPU 106 may be enabled to block or otherwise bar access to the primary boot code 302 during execution of the copied secondary boot code 502, and also block or otherwise bar access to the secondary boot code 302 after completion of execution of the copied secondary boot code 502. The application code 306 related to the secondary boot code 502 may be copied by the CPU 106 to the system memory 104. The copied application code 306 may be executed by the CPU 106 after completion of execution of the copied secondary boot code 502.

Figure 6:
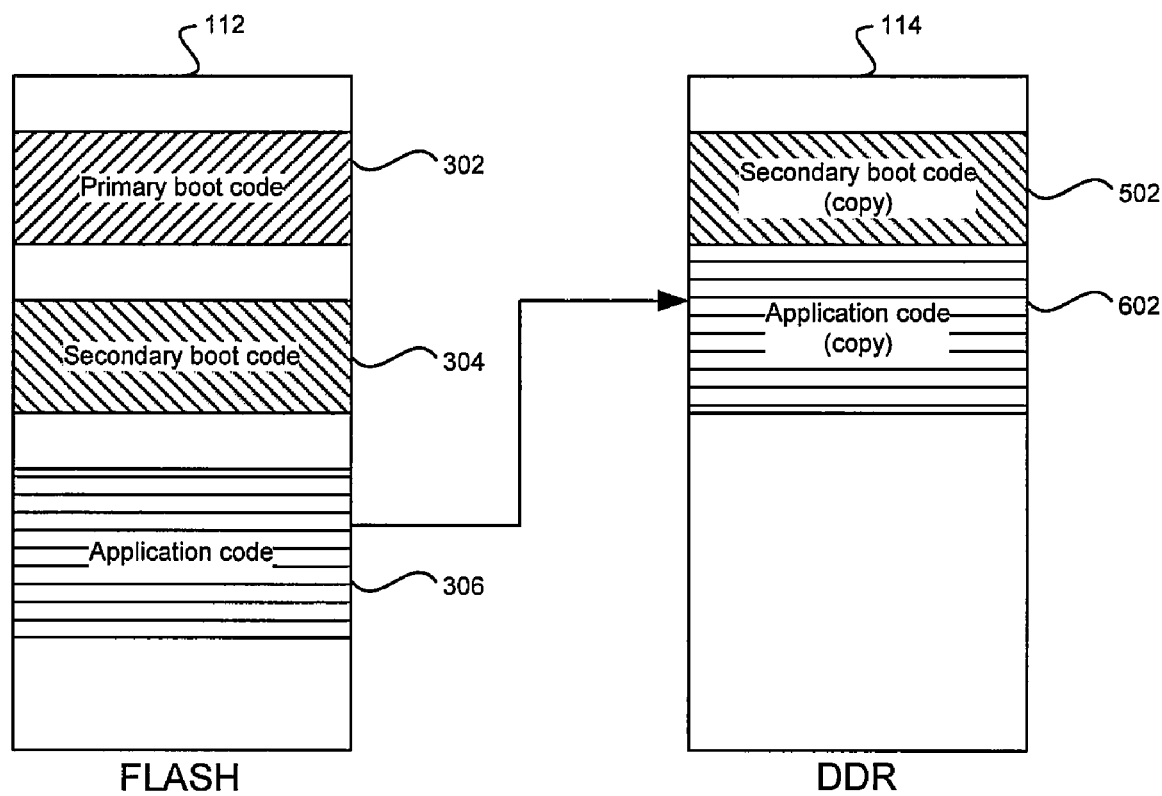
FIG. 6 is a diagram that illustrates copying an application code to the DDR, in connection with an embodiment of the invention.

FIG. 6 is a diagram that illustrates copying an application code to the DDR, in connection with an embodiment of the invention. Referring to FIG. 6, there is shown the internal memory partition of the FLASH memory 112, illustrating various memory segments that may comprise the primary boot code 302, the secondary boot code 304, and the application code 306. FIG. 6 also shows the internal memory partition of the DDR 114, illustrating various segments that may comprise the secondary boot code copy 502, and an application code copy 602.

In operation, the application code 306 is copied to the DDR 114 from the FLASH memory 112 as part of the execution sequence of secondary boot code 304. In this regard, the CPU 106 may enable execution of the secondary boot code 304, which may enable copying of related application code 306 to DDR memory 114. The CPU 106 may enable execution of the copied application code 602 from the DDR 114 after completion of execution of the copied secondary boot code 502. The secondary boot code 304 and the application code 306 may reside in FLASH memory 112. The CPU 106 may be enabled to block or otherwise bar access to the primary boot code 302 and secondary boot code 304 during execution of the copied application code 602.

Figure 7:
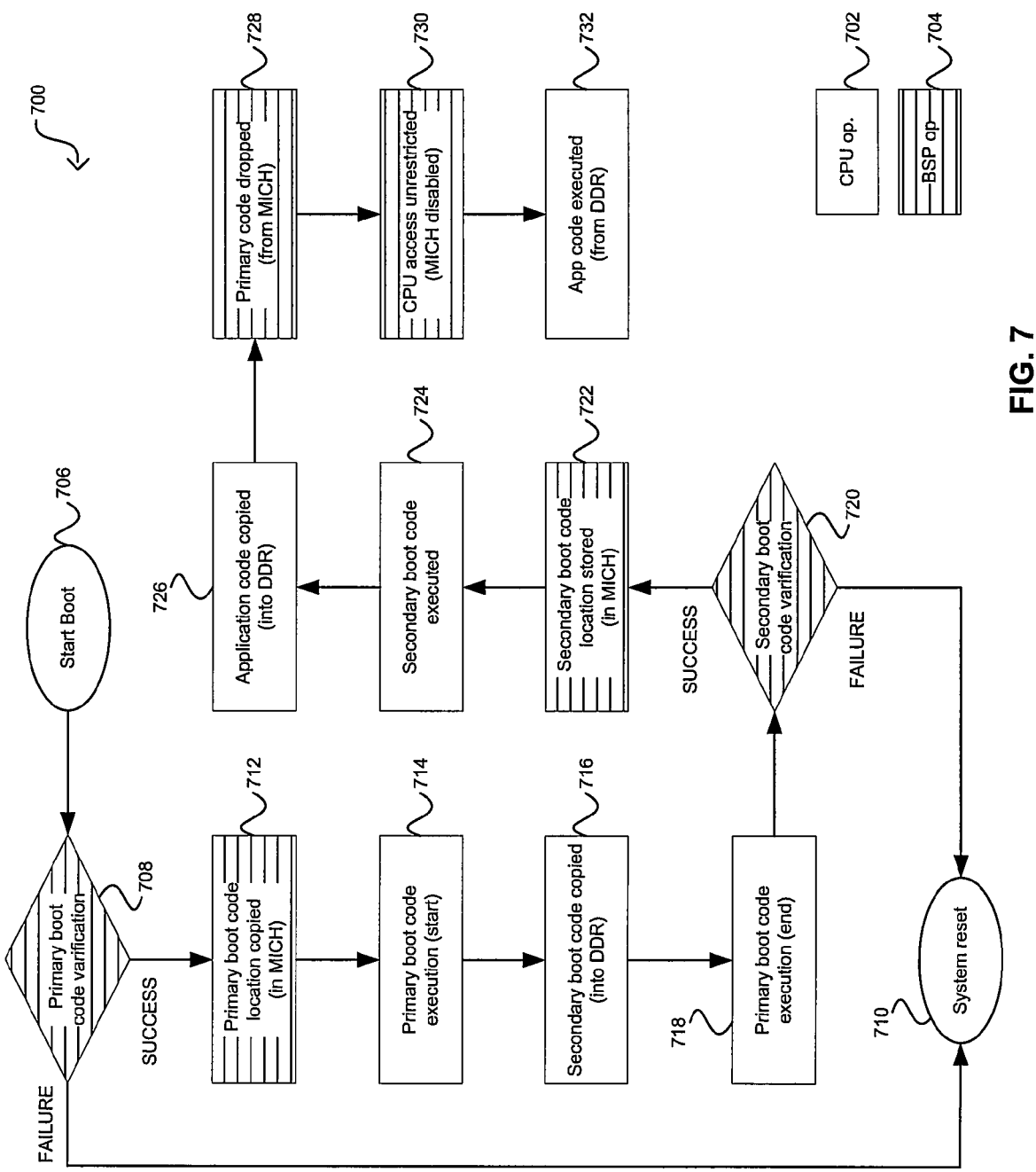
FIG. 7 is a flow diagram that illustrates an exemplary system that may be utilized for enhanced boot protection, which may be utilized in accordance with an embodiment of the invention.

FIG. 7 is a flow diagram that illustrates an exemplary system that may be utilized for enhanced boot protection, which may be utilized in accordance with an embodiment of the invention. Referring to FIG. 7, there is show flow chart 700. Exemplary steps associated with the CPU operations are shown using solid blocks as illustrated in block 702, while exemplary steps associated with the Boot Security Processor (BSP) operations are show using horizontal lines as illustrated in block 704. The BSP may control the operations of the MIPS processor 116 throughout the system boot. The MIPS processor 116 access may be further limited by the Instruction Checker (MICH) 204. In step 706, a boot operation may be initiated in the system 100. In step 708, a verification of the primary boot code is performed. This may comprise use of any software signature authentication procedure, but it may also comprise hardware based check. In instances when the outcome of the verification of the primary boot code may result in FAILURE, the process may proceed to step 710. In step 710, the system 100 may be reset.

Returning to step 708, when the outcome of the verification of the primary boot code is SUCCESS, the process may proceed to step 712. In step 712, the location of the primary boot code 302 is copied into the Instruction Checker (MICH) 204. In step 714, the primary boot code 302 is executed. In step 716, during the execution of primary boot code, the secondary boot code 304 is copied from the FLASH memory 112 to the DDR 114. In step 718, the execution of primary boot code 302 is completed. In step 720, a verification of the secondary boot code copy 502 is performed. This may comprise use of any software signature authentication procedure, but it may also comprise hardware based check. Because the main CPU 202 access was limited and controlled since the start of the system boot, and because the secondary boot code 304 was copied into a more secure hardware, the DDR 114 in prior steps (step 716), the initial hardware verification was effectively extended to later phases when the secondary boot code copy 502 is accessed and/or executed. In instances when the outcome of the verification of secondary boot code may result in FAILURE, the process may proceed to step 710. In step 710, the system 100 may be reset.

Returning to step 720, when the outcome of the verification of secondary boot code is SUCCESS, the process may proceed to step 722. In step 722, the location of the secondary boot code copy 502 in the DDR 114 may be copied into the Instruction Checker (MICH) 204. In step 724, the secondary boot code may be executed. In step 726, the application code 302 from the FLASH memory 112 to the DDR 114. In step 728, the primary boot code 302 is dropped from the MICH 204. In step 730, the MICH 204 may be disabled to allow the CPU REF #to execute unrestricted. In step 732, the copied application code 504 may be executed from the DDR 114.

Exemplary aspects of the invention may comprise copying a secondary boot code 304 to memory 104 during execution of a primary boot code 302, and executing the copied secondary boot code 502 after completion of execution of said primary boot code 302. Access to the primary boot code and the secondary boot code may be restricted during execution of the primary boot code and the copied secondary boot code. The copied secondary boot code 502 may be verified after the secondary boot code 304 is copied to the memory 104. Access to the primary boot code 302 may be blocked or barred during execution of the copied secondary boot code 502. Access to the secondary boot code 304 may also be blocked or barred after completion of execution of the copied secondary boot code 502. The memory 104 may comprise double-data-rate synchronous dynamic random access memory (DDR) 114. The primary boot code 302 and/or the secondary boot code 304 may reside or be stored in FLASH memory 112. Application code 306 related to the secondary boot code 304 may be copied to the memory 104. The copied application code 602 may be executed after completion of execution of the copied secondary boot code 502.

Certain embodiments of the invention may comprise a machine-readable storage having stored thereon, a computer program having at least one code section for enhanced boot protection, the at least one code section being executable by a machine for causing the machine to perform one or more of the steps described herein.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for booting a system, the method comprising:
    copying a secondary boot code to memory during execution of a primary boot code;
    executing said copied secondary boot code after completion of execution of said primary boot code; and
    restricting access to said primary boot code and said secondary boot code during execution of said primary boot code and said copied secondary boot code.

2. The method according to claim 1, comprising verifying said copied secondary boot code after said secondary boot code is copied to said memory.

3. The method according to claim 1, comprising blocking access to said primary boot code during execution of said copied secondary boot code.

4. The method according to claim 3, comprising removing said restricting of access after said blocking access to said primary boot code during execution of said copied secondary boot code.

5. The method according to claim 1, comprising blocking access to said secondary boot code after completion of execution of said copied secondary boot code.

6. The method according to claim 1, wherein said memory comprises double-data-rate synchronous dynamic random access memory (DDR).

7. The method according to claim 1, wherein said primary boot code and said secondary boot code reside in FLASH memory.

8. The method according to claim 1, comprising copying application code related to said secondary boot code to said memory.

9. The method according to claim 8, comprising executing said copied application code after completion of execution of said copied secondary boot code 10. A machine-readable storage having stored thereon, a computer program having at least one code section for booting a system, the at least one code section being executable by a machine for causing the machine to perform steps comprising:
    copying a secondary boot code to memory during execution of a primary boot code;
    executing said copied secondary boot code after completion of said primary boot code execution; and
    restricting access to said primary boot code and said secondary boot code during execution of said primary boot code and said copied secondary boot code.

11. The machine-readable storage according to claim 10, wherein said at least one code section comprises code for verifying said secondary boot code after said secondary boot code is copied to said memory.

12. The machine-readable storage according to claim 10, wherein said at lease one code section comprises code for blocking access to said primary boot code during execution of said copied secondary boot code.

13. The machine-readable storage according to claim 12, wherein said at lease one code section comprises removing said restricting of access after said blocking access to said primary boot code during execution of said copied secondary boot code.

14. The machine-readable storage according to claim 10, wherein said at least one code section comprises code for blocking access to said secondary boot code after completion of execution of said copied secondary boot code.

15. The machine-readable storage according to claim 10, wherein said memory comprises double-data-rate synchronous dynamic random access memory (DDR).

16. The machine-readable storage according to claim 10, wherein said primary boot code and said secondary boot code reside in FLASH memory.

17. The machine-readable storage according to claim 10, wherein said at least one code section comprises code for copying application code related to said secondary boot code to said memory.

18. The machine-readable storage according to claim 17, wherein said at least one code section comprises code for executing said copied application code after completion of execution of said copied secondary boot code.

19. A system for booting a device, the system comprising:
    at least one processor that enables copying of a secondary boot code to memory during execution of a primary boot code;
    said at least one processor enables execution of said copied secondary boot code after completion of execution of said primary boot code; and
    said at least one processor enables restricting of access to said primary boot code and said secondary boot code during execution of said primary boot code and said copied secondary boot code.

20. The system according to claim 19, wherein said at least one processor enables verification of said secondary boot code after said secondary boot code is copied to memory.

21. The system according to claim 19, wherein said at least one processor enables blocking of access to said primary boot code during said execution of said copied secondary boot code.

22. The system according to claim 21, wherein said at least one processor enables removing said restricting of access after said blocking access to said primary boot code during execution of said copied secondary boot code.

23. The system according to claim 19, wherein said at least one processor enables blocking of access to said secondary boot code after completion of execution of said copied secondary boot code.

24. The system according to claim 19, wherein said memory comprises double-data-rate synchronous dynamic random access memory (DDR).

25. The system according to claim 19, wherein said primary boot code and said secondary boot code reside in a FLASH memory.

26. The system according to claim 19, wherein said at least one processor copies application code related to said secondary boot code to said memory.

27. The system according to claim 26, wherein said at least one processor enables execution of said copied application code after completion of execution of said copied secondary boot code.

* * * * *